UNITED STATES PATENT OFFICE.

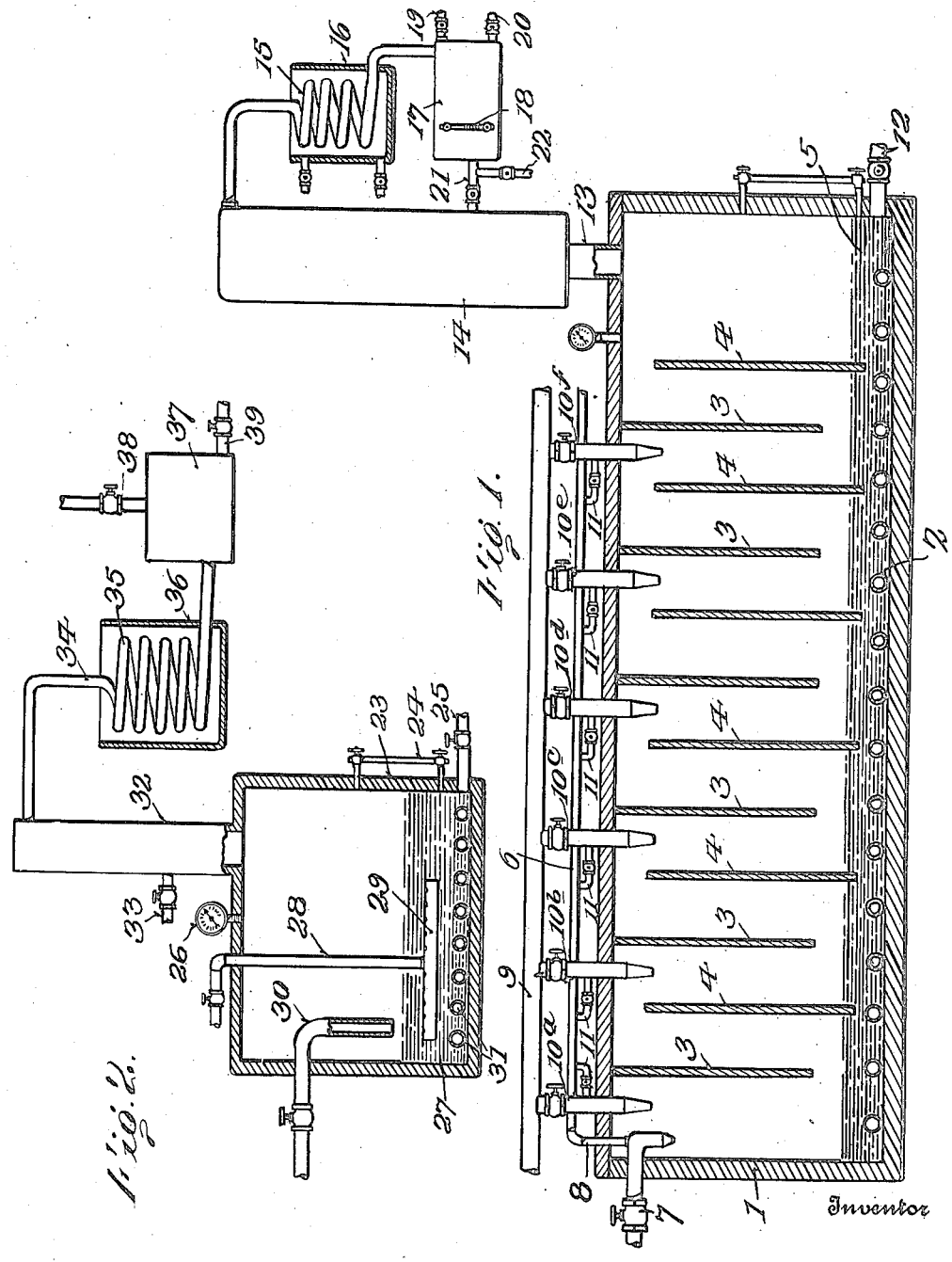

KARL P. McELROY, OF WASHINGTON, DISTRICT OF COLUMBIA, ASSIGNOR TO CHEMICAL DEVELOPMENT COMPANY, OF WASHINGTON, DISTRICT OF COLUMBIA, A CORPORATION OF MAINE.

PROCESS OF MAKING CHLORHYDRINS.

1,253,616.  Specification of Letters Patent.  Patented Jan. 15, 1918.

Application filed June 17, 1915. Serial No. 34,678.

*To all whom it may concern:*

Be it known that I, KARL P. MCELROY, a citizen of the United States, residing at Washington, in the District of Columbia, have invented certain new and useful Improvements in Processes of Making Chlorhydrins, of which the following is a specification.

This invention relates to the process of making chlorhydrins; and it comprises a method of converting gaseous or volatile olefins, or mixtures of olefins such as occur in oil gas, into chlorhydrins or mixtures of chlorhydrins, wherein such an olefin or gas comprising olefins is exposed to the action of gaseous chlorin in the presence of water vapor or steam; all as more fully hereinafter set forth and as claimed.

The gaseous and volatile olefins, ethylene, propylene, the butylenes, the amylenes, etc., are hydrocarbons of the general formula $C_nH_{2n}$ and chemically considered are "unsaturated" bodies, the amount of hydrogen present not being sufficient to saturate the combining power of the carbon. Because of this unsaturated nature, they are comparatively reactive, readily entering into chemical reaction with various other bodies. Many oxygen-containing derivatives are known as laboratory products which if it were possible to produce them economically, would be of technical value in the arts; but it has proved difficult to oxidize the olefins directly and limit the oxidation; to produce the desired derivatives without burning the hydrocarbon entirely. The present invention has for one of its purposes the provision of a simple, ready and economical method of producing materials from which these potentially valuable oxidized derivatives can be made.

The olefins readily enter into reaction or combination with chlorin; the reaction being, under some circumstances, explosive in its violence. But with porper control of temperature and other conditions to prevent the reaction going on destructively ethylene and all the other olefins on contact with chlorin are presumed to give as a main product the olefin chlorids, $C_nH_{2n}Cl_2$; ethylene giving ethylene dichlorid or "Dutch liquid," $C_2H_4Cl_2$. These olefin chlorids are valuable bodies for many purposes although not now technically produced owing to the expense of the usual sources of olefins and the difficulty of the operation. They are heavy liquids, wholly insoluble in water and while they may be converted into other derivatives of the olefins by metathetical reactions, they are so little reactive that the yields are poor and the operation expensive. For such conversions therefore the corresponding bromids are usually employed instead of the chlorids when other olefin derivatives are desired for laboratory purposes.

I have however found the reaction of chlorin upon the olefins, instead of producing olefin chlorids, under proper conditions can be directed in quite another direction with the unexpected result of producing bodies of quite another class, the chlorhydrins. The olefin chlorhydrins differ from the olefin chlorids in that they have only one atom of chlorin in lieu of two and in that they also carry oxygen and hydrogen in the form of what is known as alcoholic hydroxyl. Their general formula is $C_nH_{2n}OHCl$. Ethylene chlorhydrin, for example, is $CH_2Cl.CH_2OH$. It will be perceived that it differs from ethyl alcohol, $CH_3.CH_2OH$, in that it has one atom of hydrogen replaced by chlorin. This chlorhydrin being at once an alcohol and a chlorin compound has a wide range of solvent power, and although at present unknown in the arts has, because of its solvent power, a great potential value.

Unlike the olefin chlorids, the chlorhydrins are readily reactive bodies and may be easily and cheaply converted into glycols, acetates, benzoates, nitrates, oxids, etc. They are an excellent raw material for the other hitherto commercially unknown oxidized proximate derivatives of the olefins.

In the production of olefin chlorids the net result of the action is that the olefin molecule takes up $Cl_2$ and forms the chlorid, $C_nH_{2n}Cl_2$. If chlorin in excess be present it is apt to form higher chlorinated bodies by what is called substitution; the entrance of an atom of chlorin into the molecule replacing an atom of hydrogen.

I have found that if the contact of chlorin with these olefins be conducted in such a manner that the olefin is at all times in excess in the sphere of reaction, the higher chlorinated bodies do not form; and I have further found that if the reaction be conducted in the presence of a sufficient amount of water either as liquid or vapor instead of the formation of an olefin chlorid I obtain an olefin chlorhydrin. Curiously enough the presence of some water is necessary in the absence of any other catalyst, to bring about the reactions which result in the formation of olefin chlorids by chlorin, although the amount so required is almost vanishingly small. But as the amount of water increases the character of the reaction changes and the chlorhydrin-producing reaction takes place. In producing this latter reaction in the presence of liquid water the chlorin possibly hydrolyzes to form hydrochloric acid and hypochlorous acid (HOCl) and the latter then unites with the olefin. But the chlorhydrin-forming action however goes forward after sufficient hydrochloric acid has developed to preclude the existence of hypochlorous acid, even temporarily. In another application, Ser. No. 35505, filed June 22, 1915, I have described and claimed broadly the application of this fact to the production of chlorhydrins, chlorin being formed in or supplied to an aqueous bath which is kept saturated with the olefins so that the latter may be in excess in the sphere of reaction. In the present invention I produce the chlorhydrins in the presence of water in the vapor state or as steam.

I have found that if I dilute a gaseous olefin and chlorin with water vapor in sufficient amount instead of the chlorin combining directly with the olefin, as in making the olefin chlorids, there is a reaction, which may be termolecular, with the production of hydrochloric acid and chlorhydrin. The total reaction may be formulated as follows:—

$$Cl_2 + C_nH_{2n} + H_2O = HCl + C_nH_{2n}OHCl.$$

Hydrochloric acid forms a valuable by-product. The reaction is best carried out at about 100° C. and the dilution of the gases with the water vapor should be rather high. At 100° C. under atmospheric pressure, steam and water can coexist and the presence of both is useful; the steam to maintain the dilution and the water to absorb and remove the HCl as it forms. At about 100° C., the condensation of water as a fog scrubs the HCl out of the vapor mixture without taking down chlorhydrins. It is best to add the chlorin portionwise and maintain some excess of the olefin even at the end. The reason for these precautions is that the direct union of olefin and chlorin to form the olefin chlorid is a rather rapid reaction while the formation of chlorhydrin, which involves reaction of three molecules, is somewhat slower, although I find that under proper conditions it is preferential.

The chlorhydrin forming reaction under the present invention is one depending in large measure upon relative concentrations. Chlorin should always be in relatively low concentration, both to avoid formation of olefin chlorid and to prevent undesired chlorination or oxidation of the chlorhydrin produced. The concentration of the olefin should be greater than that of the chlorin; or, in other words, there should always be an excess, however slight. The concentration or steam or water in the reaction zone, or in other words, the amount relative to the olefin and chlorin in admixture therewith should be rather large. The reaction is one developing much heat and this is taken up by the steam. In operating at the temperature of condensing steam, the presence of much water vapor and the presence of liquid water, keep the hydrochloric acid at a low concentration in the gaseous reaction mixture; which is useful, hydrochloric acid in high concentration having a tendency to convert chlorhydrins into olefin chlorids.

All the chlorhydrins of the lower or gaseous olefins boil at about the same temperature and their separation from each other by distillation is not ready, although it may be effected by taking advantage of the fact that those with more carbon distil first in the presence of steam. Or they may be separated by conversion into oxids which may be readily fractionated and reconverted into chlorhydrins. Where pure chlorhydrins are desired, it is therefore better to use substantially pure olefins. I regard my invention as applicable to the treatment of any of the olefins which are normally gaseous or can be converted into vapor in the presence of steam. Ethylene, for example, may be converted into ethylene chlorhydrin, propylene into propylene chlorhydrin, and so on. Ethylene intended for conversion into chlorhydrin may be made in any manner desired, as by dehydrating alcohol, hydrogenating acetylene, etc.

Oil gas and similar gases made from organic materials at a comparatively low temperature and rich in gaseous olefins may be used to produce mixtures of chlorhydrins. The mixture of chlorhydrins corresponding to the mixture of olefins in oil gas is a material having important technical advantages. Other similar gases from organic materials may be used, as, for example, a gas made by coking soft coal under reduced pressure and at a low temperature. Ordinary coal gas is usually "fixed" and contains very little of the olefinic gases.

In the accompanying drawing I have shown more or less diagrammatically certain organizations of apparatus elements useful in performing the described process. In this showing:

Figure 1 is a view, partly in central longitudinal section and partly in elevation of one form of apparatus; and Fig. 2 is a similar view of another form.

In Fig. 1 element 1 is a casing which may be made of stoneware, stone slabs or other material adapted to resist the action of chlorin or hydrochloric acid. In its base it is provided with steam coils 2 for heating purposes. It is divided by alternating depending baffles 3 and intermediate baffles 4 so as to give a circuitous pathway for mixed gases and steam. As shown the intermediate baffles dip into the surface of a body of boiling water or weak hydrochloric acid 5 in the base of the casing. Steam main 6 furnishes steam. Gas enters at one end of the chamber through 7, being sent into the chamber and admixed with steam by injector 8. Chlorin may be sent into the chamber at a variety of points from chlorin main 9 by means of valved feed pipes $10^a$, $10^b$, etc., each provided with a steam injector 11. At the other end of the casing is draw off 12 for hydrochloric acid. At the top of the casing is vapor outlet 13 leading to element 14 which in substance is a column still and may be provided with the usual septa, plates or partition (not shown). Condenser 15 in the tub 16 provides for condensation of chlorhydrin vapors. The condensate is led into the tank 17 provided with gage glass 18. Gases pass on to a source of use (not shown) through conduit 19 while liquid may be drawn off at 20. Valved return 21 may be used to return aqueous liquid to a high point in the still body where the composition of the vapors is analogous to that of the returned liquid. Outlet 22 allows aqueous liquid to be sent elsewhere.

The apparatus of Fig. 2 is the same in principle but instead of using outside steam for dilution of gas and chlorin the vapor in the apparatus is relied upon. In this showing 23 is an acid proof casing provided with gage glass 24, draw off 25 for acid and pressure gage 26. At its base it is adapted to hold a body of liquid 27. Dipping into the liquid is chlorin pipe 28 having a minutely perforated cross-pipe 29. Ending immediately above the liquid is gas pipe 30. Steam pipes 31 provide heat. From the top of the casing leads fractionating column 32 provided with water inlet 33. Vapors are led by pipe 34 to worm 35 in tub 36. Condensate passes to collecting tank 37 whence gas escapes at 38 and liquid is drawn off at 39.

In the employment of the structure shown in Fig. 1, gas which may be a pure olefin or may be a mixture containing a number of olefins, such as oil gas, is taken in from supply main 7 by the action of steam injector 8, which dilutes it uniformly with steam. Chlorin is similarly introduced from $10^a$ by steam jet 11. The mixture of steam, chlorin and gas is forced to take a tortuous passage through the casing by the alternating baffles or partitions during which combination with formation of chlorhydrin takes place. The provision of a number of chlorin inlets $10^b$, $10^c$, etc., renders it possible to introduce the chlorin in successive small fractions; and this is in general the best way of operating. During the operation the liquid 5 is kept at the boiling point by coils 2, furnishing most of the diluent water vapor necessary in operating the chamber. It is usually best to introduce only a small amount of steam by the steam jets; an amount corresponding to the amount of water taken away as dilute hydrochloric acid and as chlorhydrin solution. Hydrochloric acid is removed at outlet 12 from time to time or continuously. When the chamber is run properly the body of liquid will contain substantially no chlorhydrin; and if the gas be clean, it will contain very little organic matter. The acid may be concentrated and recovered for commercial purposes in any of the known ways. While it may be delivered from 12 at a stronger concentration, say 19 to 20 per cent., I prefer to deliver it at about 10 per cent. strength. With the liquid in layer 5 of only 10 per cent. strength, little HCl gas will remain in the chamber gases. The presence of much HCl slows the reaction and may convert some of the chlorhydrin into chlorid.

The unchanged gases, the chlorhyrins and some steam escape the chamber at outlet 13. The boiling point of the chlorhydrins produced from oil gas when in a dry condition is between 125 and 135° C.; but in the presence of water vapor they are freely volatile at 100° and below. The effluent gases passing through 13 enter column still 14 where most of the acid and water are condensed and returned to the chamber. The gas, the chlorhydrin and some water vapor pass on to condenser 15 and thence into tank 17.

Using oil gas and obtaining the corresponding mixture of chlorhydrins, if 14 be an efficient type of still and the operation be relatively slow, the condensate delivered by 15 will be a milky mixture of heavy oily drops of chlorhydrins with a saturated solution of chlorhydrins. This mixture may be separated in 17 and the oily portion drawn off at 20 while the saturated solution is returned to still 14 midway its height. Or the saturated solution may be drawn off at outlet 22 for redistillation elsewhere.

The apparatus may of course be run so as to give only a more or less dilute solution of chlorhydrin as a condensate in 15; this condensate being thereafter neutralized or redistilled. But I regard it as more advantageous to prepare a distillate so strong that chlorhydrins will separate, not only because I obtain my product directly and simply but because the stronger the distillate the less acid will accompany it.

The oily chlorhydrins obtained directly, or after redistillation, may be treated with a little chalk or sodium carbonate to neutralize free acid and then dried by distillation or by chlorid of calcium. The mixture of chlorhydrins obtained from oil gas is a clear, heavy liquid, sinking in water and floating in a saturated salt solution. It has a pleasant odor, is an excellent solvent of cellulose acetate and many other coating materials and boils and otherwise behaves like a unitary body.

The reaction chamber should be of ample size to afford time for the chlorhydrin reaction to occur in the passage of gas therethrough and to allow ample dilution of gas and chlorin with steam. The mixture of the three reacting bodies, gas, steam and chlorin, should be as intimate as possible. The provision of a number of inlets for the chlorin while not indispensable is nevertheless highly advantageous as preventing the possibility of a local accumulation or concentration of chlorin with formation of olefin chlorids. The operation should be so conducted that the effluent gases, either in using oil gas or pure olefins, shall show a little remaining olefin, but no substantial amount, say not over 5 per cent. on treating with bromin in the ordinary gas analysis apparatus; and so that no oils insoluble in water appear at the condenser. As stated, chlorhydrins may, and usually do separate from the condensate; but they are soluble in water, usually dissolving in about twice their volume of water. The olefin chlorids, on the other hand, are insoluble in water and if the distillate shows an oily separation which will not wholly redissolve on dilution, olefin chlorids are being formed because of a local concentration of chlorin somewhere in the chamber. In this event, manipulation of the several chlorin inlets will obviate the difficulty.

The operation of Fig. 2 is substantially the same save that the boiling of the liquid is relied on to furnish water vapor. The chlorin in bubbling through the liquid is thoroughly diluted with vapor. No steam being furnished the chamber, water is led in at 33 performing a useful function in diminishing the amount of acid passing thereabove.

The temperature of the reaction chamber may be at any point desired, but 100° C. or a temperature corresponding to the boiling point at atmospheric pressure works well and is convenient. By raising or lowering the pressure the temperature in the reaction chamber may be correspondingly changed. In the present operation it is desirable to have both liquid and vapor present and to have a body of boiling liquid which furnishes most of the water vapor necessary for diluent and reaction purposes; but the boiling point of course depends on the pressure.

Where olefin chlorids are produced in any quantity they can be separated by distillation in the same manner as and with the olefin chlorids and afterward separated by washing with water. The chlorhydrins being soluble dissolve to form a solution from which they may be afterward recovered by distillation. As stated, the olefin chlorids are also valuable bodies. However the present invention being primarily intended for the production of chlorhydrins it is ordinarily desired to adjust conditions within the chamber so as to produce a distillate which is completely soluble in water.

Any oil gas may be used in the present invention which has not been "fixed" or otherwise treated by exposure to a high temperature; but it is best to use one made at a moderately low temperature, say around 700° C., by passing crude petroleum, gas oil, heavy residues, etc., through a hot tube or retort. Highly naphthenic oils are not as good as "paraffin base" oils. Working under ordinary conditions of pressure with an iron retort, such gas will run about 45 to 50 per cent. total olefin, ethylene, propylene, butylenes and amylenes; 35 per cent. or more being ethylene and propylene together. The relative proportions of the various olefinic gases will however vary considerably with the method of manufacture and purification adopted. Gasification under reduced pressure gives a better and richer gas. An expedient which leads to economy in oil is to return to the gasifying zone a portion of the waste gas after the olefins have been absorbed therefrom, gasifying the oil in its presence. With return of some gas and the use of reduced pressures in gasifying important economies in oil may be secured.

Instead of making oil gas by gasifying oil in a retort, the gases formed in stills used for distilling petroleum may be employed. The gas given off in the first stages of distillation is not ordinarily rich in olefins but that from the later stages, and especially in cracking, is often quite rich.

Instead of oil gas, a gas made by coking coal or charring wood at low temperatures under reduced pressures may be employed; but oil gas I consider the best material.

The oil gas may be submitted to the usual cooling, scrubbing and purifying to remove unchanged oil, tar, sulfur, etc. In making the particular chlorhydrin mixture of the present invention, readily condensable olefins should also be removed. The gas usually contains some acetylene, or bodies of the acetylene series, which can be removed. This may be done by passing the gas over metallic copper at 250 to 300° C., or by scrubbing it with a solution of copper acetate, with a magma containing copper hydrate, etc. A magma formed by precipitating copper sulfate solution with lime works efficiently.

Whether the gas be further treated depends upon the character of the gas and the nature of the chlorhydrins desired. If a mixture of ethylene and propylene chlorhydrins be desired, while other methods of purification be desired, the gas is best next compressed to 75 or 100 pounds and cooled. This removes by condensation the bulk of the butylenes and amylenes; which may be separately used in the present process to produce the corresponding chlorhydrins. Or the gas may be scrubbed with a little chilled oil which also removes these bodies. A combined treatment by compressing, chilling and scrubbing with cold oil gives a particularly clean gas containing mainly ethylene, propylene, ethans, methane and a little hydrogen. Ethane, methane and hydrogen are inert in the present process. The presence of a little residual butylene and amylene in the gas is however often desirable.

Ethylene or propylene made from other sources and in a pure state may be used in the present process; ethylene, for example being readily producible by hydrogenating acetylene in the presence of catalysts. Pure olefins produce pure chlorhydrins. But as stated, the mixture of chlorhydrins made from the mixed olefins of oil gas is, for the present purposes more desirable than the pure individual chlorhydrins.

Where pure chlorhydrins are required for any purpose it is more economical to produce the mixture of the present invention, break up with caustic soda to make olefin oxids, fractionate these oxids and then reconvert to chlorhydrins with hydrochloric acid.

In working with an uncompressed gas or gas not scrubbed with oil to take out higher olefins, where a pure hydrochloric acid as a by-product a desideratum, the gas may be scrubbed with hot hydrochloric acid which, of course, takes out all components soluble in or combining with hydrochloric acid. With a gas rich in amylenes, this acid scrub offers the further advantage that some of the amylenes are removed as monochlorpentanes which may be recovered and converted into amyl alcohols (fusel oil) or their acetates. The condensate from compressed and chilled gas is rich in amylenes and may be directly used for making chlorpentane with HCl.

What I claim is:

1. The process of making chlorhydrins which comprises establishing and maintaining a body of boiling aqueous liquid in a suitable reaction chamber having a vapor space and introducing chlorin and an olefin into such chamber so as to mix in such vapor space.

2. The process of making chlorhydrins which comprises establishing and maintaining a body of boiling aqueous liquid in a suitable reaction chamber having a vapor space and introducing chlorin and oil gas into such chamber so as to mix in such vapor space.

3. The process of making chlorhydrins which comprises admixing gaseous chlorin, an olefin and water vapor in a suitable vapor space in the presence of a bath of an aqueous liquid at about the boiling point, cooling the vapors resulting to a sufficient degree to condense out most of the water and of the hydrochloric acid resulting from the reaction, returning the condensate to the bath and further cooling the vapors to produce condensed chlorhydrin and water.

4. The process of making chlorhydrin which comprises admixing gaseous chlorin, oil gas and water vapor in a suitable vapor space in the presence of a bath of an aqueous liquid at about the boiling point, cooling the vapors resulting to a sufficient degree to condense out most of the water and of the hydrochloric acid resulting from the reaction, returning the condensate to the bath and further cooling the vapors to produce condensed chlorhydrin and water.

5. The process of making chlordydrins and hydrochloric acid which comprises establishing and maintaining a body of aqueous liquid at about the boiling point in a suitable reaction chamber having a vapor space, and supplying steam, gaseous chlorin and gaseous olefin so as to mix in such vapor space to such chamber while withdrawing concentrated chlorhydrin vapors and hydrochloric acid solution therefrom.

6. The process of making chlorhydrins and hydrochloric acid which comprises establishing and maintaining a body of aqueous liquid at about the boiling point in a suitable reaction chamber having a vapor space, and supplying steam, gaseous chlorin and gaseous olefin so as to mix in such vapor space to such chamber while withdrawing concentrated chlordydrin vapors and hydrochloric acid solution therefrom, the supply of steam, gas and chlorin and the withdrawal of solution being at such a ratio as to maintain a relatively low concentration of hydrochloric acid in said aqueous body.

7. The process of making chlorhydrins which comprises allowing gaseous chlorin to react upon a gaseous olefin in the presence of sufficient water vapor to restrain the formation of olefin chlorid.

8. The process of making chlorhydrins which comprises admixing gaseous chlorin with oil gas in the presence of sufficient water vapor to restrain the formation of olefin chlorid.

9. The process of making chlorhydrins which comprises producing a mixture of chlorin, a gaseous olefin and water vapor in the presence of liquid water, the amount of such water vapor being sufficient to restrain the formation of olefin chlorids to a substantial extent.

10. The process of making chlorhydrins which comprises producing a mixture of chlorin, oil gas and water vapor in the presence of liquid water, the amount of such water vapor being sufficient to restrain substantially the formation of olefin chlorids.

11. The process of making chlordydrins which comprises producing a mixture of an olefin and water vapor and adding chlorin to such mixture in a plurality of successive additions.

12. The process of making chlorhydrins which comprises producing a mixture of steam and oil gas and adding chlorin to such mixture in a plurality of successive additions.

13. The process of making chlorhydrins which comprises transmitting a mixture of steam, oil gas and chlorin through a chamber heated to a temperature around 100° removing the gases and vapors from the chamber and cooling to condense and recover the produced chlorhydrins.

14. The process of making chlorhydrins which comprises transmitting a mixture of steam, oil gas and chlorin through a chamber heated to a temperature around 100° in the presence of material adapted to absorb HCl, removing the gases and vapors from the chamber and cooling to condense and recover the produced chlorhydrins.

15. The process of making chlorhydrins which comprises transmitting a mixture of oil gas and steam through a chamber at a temperature around 100°, adding chlorin to the mixture at a plurality of points in its course, removing the gases and vapors from the chamber and cooling to condense and recover the produced chlorhydrins.

16. The process of making chlorhydrins which comprises blowing steam and oil gas into and through a horizontal baffled chamber in a circuitous path, said chamber being maintained at a temperature of about 100° C. and containing a body of hot water to act as an absorbent for HCl and to furnish vapor reinforcing the amount of steam, removing the hot vapors and gases and condensing to obtain chlorhydrins.

In testimony whereof, I affix my signature.

K. P. McELROY.